March 28, 1961 H. O. SCHJOLIN 2,976,965
HYDRAULIC COOLING SYSTEM FOR A MULTIPLE DISK BRAKE
Filed March 14, 1958 2 Sheets-Sheet 1
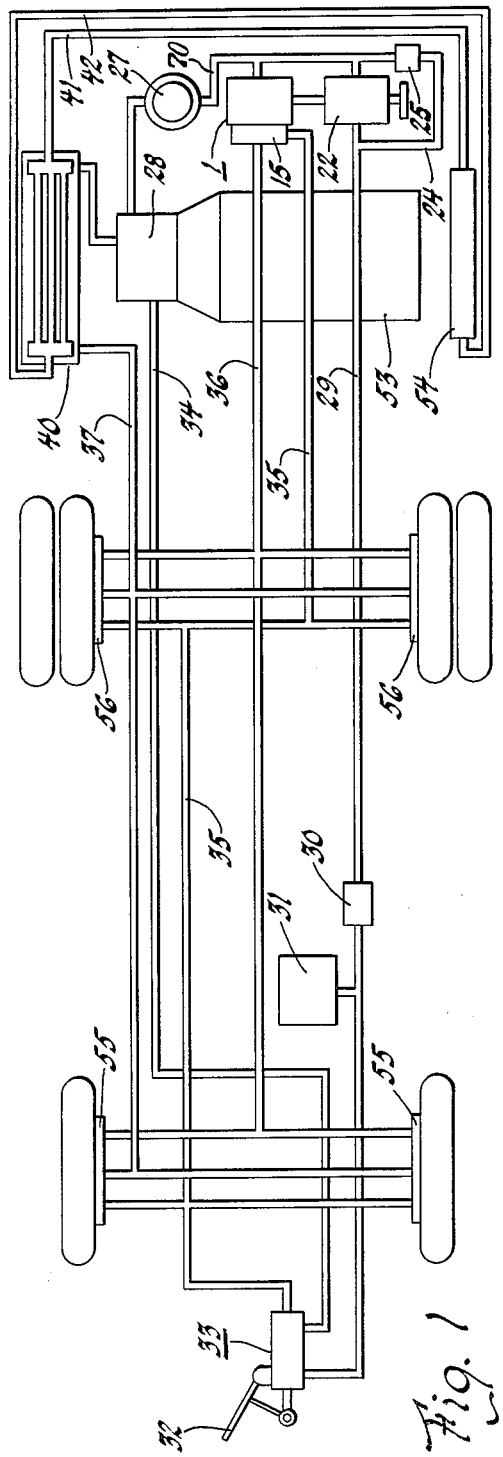
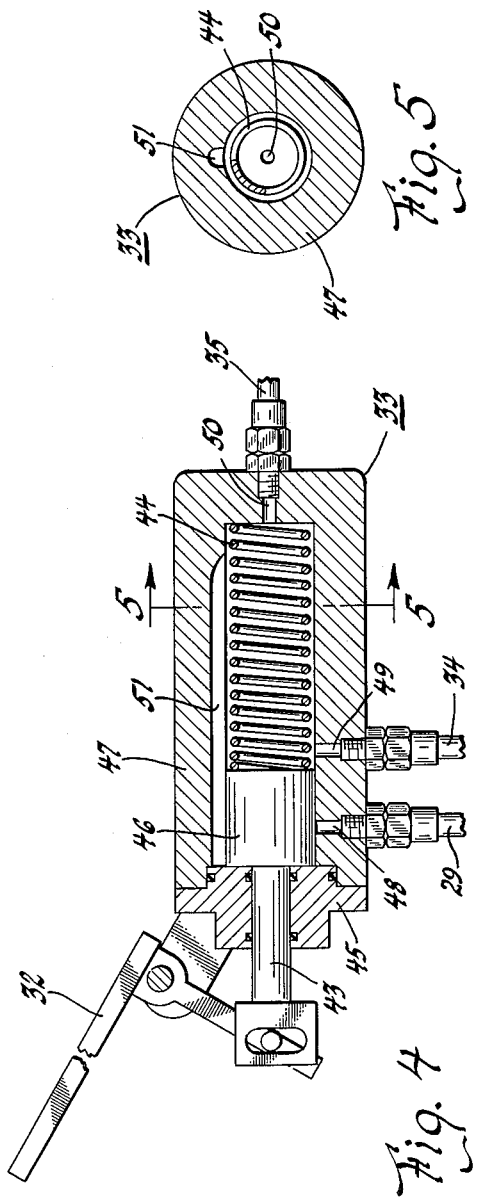
INVENTOR.
Hans O. Schjolin
BY
HIS ATTORNEY

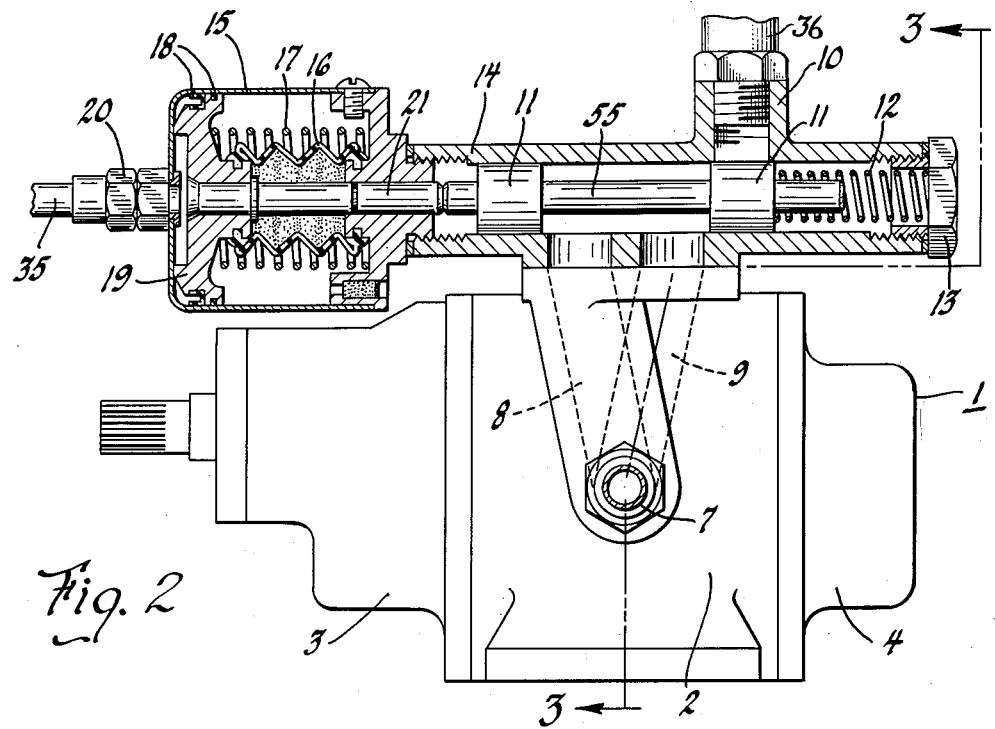
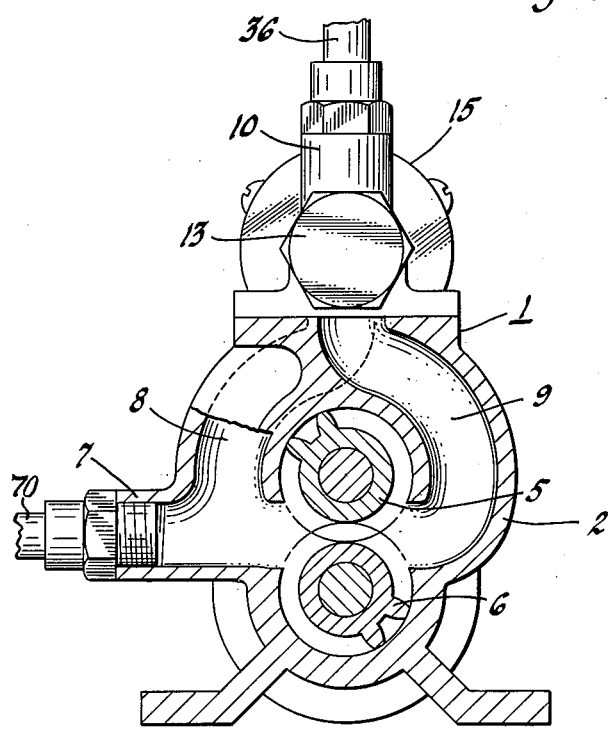

United States Patent Office 2,976,965
Patented Mar. 28, 1961

2,976,965
HYDRAULIC COOLING SYSTEM FOR A MULTIPLE DISK BRAKE

Hans O. Schjolin, Birmingham, Mich., assignor to General Motors Corporation, Detroit, Mich., a corporation of Delaware Filed Mar. 14, 1958, Ser. No. 721,548

5 Claims. (Cl. 188—264)

This invention relates to a fluid-operated and fluid-cooled vehicle brake, and more particularly to the hydraulic system for operating and cooling a fluid brake.

With the use of a heavy-duty, fluid-operated and fluid-cooled brake, it is necessary to provide a pressure generating means for operating the brake and also a means for controlling the circulation of the cooling fluid. This may be done by the use of one fluid system or a combination of more than one system. It also requires various controls for the circulation of this fluid as well as the cooling of the fluid after it has absorbed the dissipated heat within the brake.

It is the object of this invention to provide a hydraulic system wherein a pressure is generated for the actuation of the brakes. Within the system the necessary valves and controls are employed to provide the actuation of the brakes whenever desired.

It is another object of this invention to provide a cooling fluid system employing means for creating a pressure within the system for circulation of the cooling fluid through the brakes when the brakes are being operated.

It is a further object of this invention to provide pressure-controlled by-pass valves for said pressure generating means when the pressure in these two systems is not being used to apply the brakes or cool the brakes.

It is a further object of this system to provide a filtering and cooling means and a common reservoir for the fluid within these fluid systems.

It is a further object to provide a heat exchanger means for cooling the brake fluid systems. The heat exchanger transfers the dissipated heat to the vehicle radiator fluid.

The objects of this invention are accomplished by means of a high-pressure, low-volume fluid pump within a fluid system which is operated from the power of the vehicle engine. This pump is provided with a by-pass valve when the fluid is not needed and there is also provided a check valve and accumulator in the feed side of the fluid circuit for maintaining a constant pressure. A lever-operated valve is used to apply pressure to the wheel cylinders when it is desired to provide a braking effort on the wheels. Connected with this valve, a return for the fluid to the common reservoir is also provided through the return side of the fluid line. A second fluid pump is also used for generating a low-pressure, high-volume system for the brake cooling fluid. This pump is connected to a by-pass valve which, in turn, is operated by a piston. This piston is operated by the high-pressure fluid system when the brakes are applied. The by-pass valve is then closed and the fluid is allowed to pass through the brake cooling fluid feed line to the brakes. As the fluid passes through the brakes it then flows through the return side of the cooling line to a heat exchanger. This heat exchanger is cooled by means of circulation of a radiator fluid from the radiator of the vehicle. Upon passing through the heat exchanger, the brake-cooling fluid then returns to the common reservoir. This type of hydraulic means provides a common fluid reservoir for both the brake actuating fluid circuit and the cooling fluid circuit and also the automatic controls for the fluid cooling of the brakes only upon operation of the brakes.

Further objects and advantages of the present invention will be apparent from the following description, reference being had to the accompanying drawings wherein preferred embodiments of the present invention are clearly shown.

In the drawings:

Fig. 1 discloses a diagram of the hydraulic brake operating fluid, the brake cooling fluid, and the radiator fluid. It also shows the various valves and controls for applying the brakes and cooling the brakes.

Fig. 2 is a cross-section view of the pressure controlled valves for the high-volume pump. Only the piston and cylinder with the control valves are shown in cross section. The portion of the pump is shown as a side view.

Fig. 3 discloses a cross-section view of a gear pump which is used for the high-volume, low-pressure fluid system for cooling the brakes. The high-pressure, low-volume pump is of similar structure. Fig. 3 is cut on line 3—3 as shown at Fig. 2.

Fig. 4 shows the foot-operated control valve for the brake actuation.

Fig. 5 is a cross-section view as dictated by arrows 5—5 in Fig. 4.

This hydraulic system may be used in conjunction with a fluid-operated and fluid-cooled vehicle brake such as disclosed in copending application, Serial No. 714,774 filed on February 12, 1958, which is a copending application of the same assignee.

Fig. 1 disclosing the general layout of the hydraulic system shows a fluid pump at 1. This fluid pump is shown in detail in Figs. 2 and 3. The pump housing is shown at 2 with end plates 3 and 4 mounted on opposite ends. Two gears 5 and 6 are driven by the vehicle engine 53. Fluid inlet passage 7 leads to the input side of the rotating gears 5 and 6. As the fluid is forced through the pump it enters passage 9. When the by-pass valve is in an open position as shown in Fig. 2, the fluid circulates back into the by-pass return 8.

The control valve for the high-volume, low-pressure pump 1 is connected to a cylinder 15. Cylinder 15 is connected by operating fluid conduit 35 and fitting 20 to brake pedal control valve 33. Piston 19 is provided with seal 18 and is fluid actuated to move axially within cylinder 15. The piston operates against the spring 17 and the bellows 16, thereby moving the rod 21, which, in turn, is connected to the valve 11 through rod 55. As the valve 11 moves to the opposite end within the cylinder 14, the by-pass valve is closed and the outlet opening 10 receives fluid from the pump 1.

The hydraulic pump 22 is a pump of the same type as the pump shown at 1 except it is adapted to create a high-pressure and a low-volume output. This pump is also driven by power from the vehicle engine 53. This pump is provided with a spring-biased conventional by-pass valve 25 and by-pass conduit 24. This valve 25 is in operation whenever fluid is not needed for brake actuation. The fluid conduit 29 leads from the outlet of this pump 22 to a check valve 30. An accumulator 31 is provided between the control valve 33 and the check valve 30. This accumulator builds up a pressure which is available for actuation of the brakes when needed. The control valve 33 is operated by means of a pedal 32. This valve 33 is shown in more detail in Fig. 4.

Fig. 4 is a cross section of this valve showing the inlet port 48 which is connected to the high-pressure side of pump 22. This inlet port 48 is closed when the brakes are not in operation. When it is desired to operate the brakes, pedal 32 is depressed thereby moving rod 43 slidably through end plate 45 and into the cylinder 47 against spring 44. As the pedal is further depressed, the outlet port 49 which is connected to fluid conduit 34 is closed. As the piston 46 continues to move after closing port 49, port 48 is then opened and connected to port 50 through by-pass 51. The fluid from conduit 29 then flows around the piston 46 through the by-pass portion 51 and out the actuating port 50. This, in turn, provides pressure for actuating the wheel cylinders within the brakes. The conduit 35 is connected to the cylinder 15, which is connected to the control valve housing through the cylinder mounting.

The outlet port 10 of the control valve in the cooling fluid system is connected to the feed conduit line 36, and provides an outlet for circulating cooling fluid to the front brakes 55 and rear brakes 56 when the brakes are applied. The cooling fluid as it passes through the brakes then returns through the conduit 37 to the cooler as shown at 40.

The cooler is provided for transfer of heat from the cooling fluid through the passage walls to the vehicle radiator cooling fluid. The vehicle radiator cooling fluid is circulated through this cooler 40 and then through the radiator 54 through feed conduit 41 and return conduit 42. The brake cooling fluid upon passing through the cooler returns to the common reservoir 28.

Fig. 4 discloses the outlet port 49 feeding into a return conduit 34. This also feeds into the common reservoir 28, thereby providing a common reservoir for both the actuating and cooling fluid. A passage means is also provided from the reservoir through a filter 27. This passage feeds to the low sides of both the high-pressure pump 22 and the low-pressure pump 1.

The hydraulic fluid brake actuating and cooling circuits operate in this described manner. When the vehicle engine 53 is in operation, the fluid pumps 1 and 22 are also in operation. The fluid pump 22 is a high pressure pump and maintains a pressure for actuating the brake. The suction side of the high pressure low volume pump 22 is connected to the reservoir 28 through the filter 27. This provides a constant supply of hydraulic fluid for the pump 22. The pump 22 operates by discharging into the conduit 29 and is a positive displacement pump. A low quantity of fluid is required for actuation of the vehicle brakes and a by-pass valve 25 is placed within the by-pass circuit 24. Valve 25 is of the conventional type which permits by-pass of fluid around pump 22 when fluid is not needed for brake actuation while maintaining the necessary pressure for brake actuation. The constant pressure in conduit 29 feeds through the check valve 30 and creates a residual pressure within the accumulator 31. The pressure created by the accumulator 31 maintains a constant pressure at the point adjacent to pedal control valve 33. When the vehicle brakes are actuated, the pedal 32 is depressed thereby allowing pressure into the conduit 35 leading to the front wheel brakes 55 and the rear wheel brakes 56. The pressure in conduit 35 is also transmitted to the cylinder 15 and piston 19 which are connected to the by-pass control valve 11. The pressure within the cylinder 15 moves the piston 19 axially to close the passage means 8 and open the passage means 9 to the port 10.

In this manner, when the vehicle brakes are actuated, the cooling circuit is also in operation to provide cooling of the vehicle brakes. The brake cooling fluid circuit includes the high volume low pressure pump 1. Pump 1 is also in communication with the reservoir 28 and filter 27 through the passage 70 on the suction side of the pump 1. The pump 1 is in operation when the vehicle engine 53 is in operation. It is noted that, when the vehicle brakes are not actuated, the by-pass valve 11 is in the position as shown in Figure 2. This permits circulation of the brake cooling fluid through the passage 9 and to return through the passage 8 of pump 1.

When the vehicle brakes are actuated, the pedal 32 is depressed, moving the valve 46 to open port 48 and close port 49. This movement of valve 46 places port 48 in communication with port 50 and pressurizes fluid in conduit 35. The piston 19 compresses spring 17 in response to pressurized fluid admitted from the conduit 35. This in turn opens the passage 9 to the port 10 for circulation of cooling fluid through conduit 36. The conduit 36 leads to the front wheel brakes 55 and the rear wheel brakes 56. These brakes are provided with passage means for circulating the cooling fluid through the brakes. Return passage means 37 is in communication with the brakes 55 and 56. This return passage 37 is directly connected to the heat exchanger 40. A second passage means is also in connection with the heat exchanger 40 for returning of the cooling fluid to the reservoir 28. The cooling fluid circuit thereby is in circulation only when the vehicle brakes are actuated. The cooling fluid must return through conduit 37 and the heat exchanger 40 to the reservoir 28. Passage 70 returns the fluid from the reservoir 28 to the pumps 1 and 22. This provides a cooling means for the vehicle brakes when the vehicle brakes are in operation.

The heat exchanger 40 is provided with a second hydraulic fluid system for removal of the heat transferred to the heat exchanger from the brake cooling fluid. This second fluid circuit includes the conduit means 41 and 42 which provide feed and return of the vehicle radiator fluid through the radiator 54. The radiator fluid is in continuous circulation when the vehicle engine is in operation. The circulation of the radiator fluid through the heat exchanger may be provided by any conventional means.

In operation, the vehicle brakes are actuated which, in turn, permits circulation of the brake cooling fluid. The brake cooling fluid transfers the dissipated heat within the braking structure to the heat exchanger. The heat exchanger transfers the heat to the radiator fluid which is later radiated to the air stream passing through the vehicle radiator. The engine cooling system includes a separate radiator fluid circuit. The brake actuating and cooling circuits comprise a fluid circuit for actuating of the vehicle brakes and also a second fluid circuit for cooling of the brakes. Both systems operate through a common reservoir 28. In this manner, the same fluid is used to actuate the vehicle brakes and to cool the vehicle brakes.

While the embodiments of the present invention as herein disclosed constitute a preferred form, it is to be understood that other forms might be adopted.

What is claimed is as follows:

1. A hydraulic fluid actuating and cooling brake system, comprising in combination; a hydraulic fluid brake actuating circuit including, a hydraulic fluid pump for creating a pressure within a hydraulic fluid actuating circuit, a by-pass circuit connected to the inlet and outlet sides of said hydraulic fluid pump having a by-pass valve, a check valve and an accumulator in communication with the outlet side of said hydraulic fluid pump to provide a residual pressure, a pedal control valve in communication with said check valve, conduit means connecting said pedal control valve to a plurality of vehicle wheel brakes, a second conduit means leading from said pedal control valve to a control means for a brake cooling fluid by-pass valve, a hydraulic fluid brake cooling circuit including a reservoir, a hydraulic cooling fluid pump, conduit means connecting said cooling fluid pump to said cooling fluid by-pass valve and said vehicle brakes, fluid conduit means leading from said vehicle brakes to a heat exchanger, said heat exchanger having return conduit means leading to said reservoir, conduit means leading from said reservoir to the inlet side of said actuating fluid pump and said cooling fluid pump, said hydraulic fluid system thereby providing a brake fluid actuating circuit interconnected to control the circulation of cooling fluid through a brake cooling fluid circuit for cooling of said vehicle brakes when said brakes are actuated.

2. A hydraulic fluid brake actuating and cooling system, comprising in combination; a brake actuating hydraulic fluid circuit including a fluid reservoir, conduit means leading from said fluid reservoir to a hydraulic actuating fluid pump, said hydraulic pump having a by-pass circuit including a by-pass valve, conduit means connected to the outlet side of said hydraulic actuating fluid pump in communication with a pedal control valve, a check valve and an accumulator in said conduit means leading from the outlet side of said hydraulic actuating fluid pump to said pedal control valve, conduit means leading from said pedal control valve to said reservoir, a second conduit means leading from said pedal control valve to a plurality of vehicle brakes to provide actuation of said vehicle brakes when said pedal control valve is operated, a brake cooling fluid circuit including a hydraulic cooling fluid pump having a normally open by-pass valve means, fluid valve control means connected to said by-pass valve operating in response to pressurized fluid in the brake fluid actuating circuit to close said by-pass valve, a heat exchanger in said fluid cooling circuit, cooling fluid conduit means placing said cooling fluid pump in communication with said plurality of vehicle brakes, said heat exchanger and said reservoir, a vehicle radiator, a third hydraulic fluid circuit for circulating radiator fluid through said heat exchanger to provide removal of the transferred heat from said vehicle brakes to said heat exchanger when said vehicle brakes are actuated.

3. A hydraulic fluid brake actuating and cooling system, comprising in combination; a hydraulic fluid brake actuating circuit including means for pressurizing a hydraulic fluid, a by-pass circuit including a by-pass means for maintaining a predetermined residual pressure in said hydraulic brake actuating fluid circuit, a check valve and accumulator for maintaining a predetermined pressure in said actuating fluid circuit adjacent to the brake actuating control valve, a brake actuating control valve having a return means to a common reservoir and conduit means leading to a plurality of vehicle brakes, a brake cooling fluid circuit including means for circulating a fluid through a brake cooling circuit, a by-pass control valve in said brake cooling fluid circuit operating in response to pressure within said brake actuating fluid system, a heat exchanger in said brake cooling circuit, said heat exchanger including a fluid circuit for circulating fluid through a vehicle radiator for radiating dissipated heat from said vehicle brakes when said vehicle brakes are actuated.

4. A hydraulic fluid brake actuating and cooling system, comprising in combination; a hydraulic fluid brake actuating circuit including means for pressurizing hydraulic fluid, by-pass valve means and conduit means in said brake fluid actuating circuit, a brake pedal control valve in said brake actuating fluid circuit, a check valve and accumulator for maintaining a residual pressure adjacent to said pedal control valve, conduit means in said brake actuating fluid circuit leading to a plurality of vehicle brakes, return passage means from said pedal control valve to a common reservoir in said brake actuating fluid system, a conduit means leading from said pedal control valve to a cooling fluid by-pass valve control means to operate said cooling fluid by-pass valve in a hydraulic fluid brake cooling circuit, the hydraulic brake cooling circuit including means for circulating a cooling fluid, conduit means between said common reservoir and said means for circulating the cooling fluid, conduit means leading to said plurality of vehicle brakes, a heat exchanger conduit means in said fluid cooling circuit for placing said plurality of vehicle brakes in communication with said heat exchanger and said common fluid reservoir, said cooling fluid by-pass control valve in said hydraulic fluid cooling system operating in response to actuation of said plurality of vehicle brakes to provide circulation of cooling fluid through said cooling fluid circuit to transfer dissipated heat from said brakes to said heat exchanger.

5. A hydraulic fluid brake actuating and cooling system, comprising in combination; a hydraulic brake actuating fluid circuit and a hydraulic brake cooling fluid circuit interconnected by common return conduit means from a common reservoir, said hydraulic fluid brake actuating circuit including means for maintaining a residual pressure in said brake actuating fluid circuit, a brake pedal control valve in said brake actuating circuit, conduit means leading from said pedal control valve to a plurality of vehicle brakes, conduit means leading from said pedal control valve to a cooling fluid by-pass valve control means to operate a cooling fluid by-pass valve, a brake cooling circuit including means for circulating a cooling fluid through said cooling fluid circuit, a heat exchanger means in said cooling fluid circuit for circulating cooling fluid from said plurality of vehicle brakes through said heat exchanger to return to the common reservoir, said by-pass control valve in said hydraulic fluid cooling circuit operating in response to pressurized fluid actuating said plurality of vehicle brakes to provide circulation of cooling fluid through said cooling system when said vehicle brakes are actuated.

References Cited in the file of this patent

UNITED STATES PATENTS

| | | |
|---|---|---|
| 2,127,557 | Ells | Aug. 23, 1938 |
| 2,195,130 | Hoyt | Mar. 26, 1940 |
| 2,378,100 | Pogue | June 12, 1945 |
| 2,451,335 | Groves | Oct. 12, 1948 |
| 2,471,858 | Bloomfield | May 31, 1949 |
| 2,496,497 | Russell | Feb. 7, 1950 |
| 2,526,236 | Ingres | Oct. 17, 1950 |
| 2,674,352 | Braun | Apr. 6, 1954 |
| 2,742,982 | Helmbold | Apr. 24, 1956 |
| 2,821,272 | Sanford et al. | Jan. 28, 1958 |
| 2,832,429 | Kelley et al. | Apr. 29, 1958 |
| 2,946,412 | Jensen | July 26, 1960 |